(12) United States Patent
Bentulan

(10) Patent No.: US 6,681,759 B2
(45) Date of Patent: Jan. 27, 2004

(54) PORTABLE EXPANSION BARBECUE GRILL APPARATUS

(76) Inventor: Anthony Bentulan, 4913 Buck Lake Rd., Tallahassee, FL (US) 32310-3763

(*) Notice: Subject to any disclaimer, the term of this patent is extended or adjusted under 35 U.S.C. 154(b) by 0 days.

(21) Appl. No.: 10/001,275

(22) Filed: Dec. 4, 2001

(65) Prior Publication Data

US 2002/0112717 A1 Aug. 22, 2002

Related U.S. Application Data

(60) Provisional application No. 60/252,693, filed on Nov. 24, 2000.

(51) Int. Cl.[7] ............................................. F24C 15/16

(52) U.S. Cl. ............................. 126/25 R; 126/337 A

(58) Field of Search ............................ 126/41, 25 A, 126/26, 25 AA, 28, 273 R, 337 R, 339, 337 A, 304 A, 25 R; 99/327, 401

(56) References Cited

U.S. PATENT DOCUMENTS

| 4,126,087 A | * | 11/1978 | McLamb | 99/327 |
| 4,862,792 A | * | 9/1989 | Lerma, Jr. | 99/401 |
| 4,886,045 A | * | 12/1989 | Ducate, Jr. et al. | 126/41 |
| 4,895,131 A | * | 1/1990 | Overholster | 126/41 |
| 5,293,859 A | * | 3/1994 | Lisker | 126/26 |
| 6,039,039 A | * | 3/2000 | Pina, Jr. | 126/25 |

* cited by examiner

Primary Examiner—Henry Bennett
Assistant Examiner—S. Dagostino

(57) ABSTRACT

The present invention is a multifunctional portable barbecue grill that is designed and configured to expand in order to increase and/or decrease the total size the cooking surface of the particular grill. The grill includes a mainframe that supports the housing. Located in the housing is a grate. The mainframe, housing and grate include a slideably extension system for increasing or decreasing the length of the grill. In addition, for convenience and added comfort, the mainframe of the grill can be altered in height to provide for a comfortable height for the cook as well as provide for an easy means for storage and transportability.

10 Claims, 4 Drawing Sheets

PORTABLE EXPANSION BARBECUE GRILL APPARATUS

This is a Utility Patent Application for Provisionally File Application No. 60/252,693 filed on Nov. 24, 2000.

BACKGROUND OF THE INVENTION

1. Field of the Invention

The present invention relates generally to a barbecue grill and more particularly to an adjustable barbecue grill apparatus that includes a grill surface that is adapted to easily and quickly expand or decrease in length for innately providing an increased or decreased cooking surface and/or increase or decrease in height, consequently providing a customized and comfortable fit for the particular cook. Inherently providing a grill that will enable a cook to efficiently and successfully accommodate any amount of food by rendering a cook to utilizes the desired amount of grill space for optimizing the cooking process for the comestibles on the grill surface.

2. Description of the Prior Art

It is undeniable that food cooked on a grill is not only deliciously but also provides a healthy means of preparing comestibles. Many find that grilling produces tasty cuisine, at the same time providing the act of grilling to be an easy and enjoyable task. Thus, it is not surprising that most homes today do have one form or another of a grill. Grills come in a variety of shapes, sizes, forms and even being configured for a specialized task, such as smoking.

To aid and assist the cook, devices have been developed for improving on a variety of grilling apparatus. For example in U.S. Pat. No. 5,481,964 issued to Kitten there is disclose a barbecue pit that is designed and configured to improve the process of barbecuing by providing a barbecue pit that will providing even heat distribution in the even by providing an oven that is rarely opened. Thereby preventing the smoke and heat to escape therefrom. To enable such a configuration, this grilling apparatus comprises an oven and a firebox mounted upon a frame. Access to the oven is provided for by a rack opening wherein a rack rolls in and out of the oven on rollers and features a series of doors which close the rack opening of the oven when the doors are properly aligned.

For food which require different heat for successful cooking a grill is disclosed in U.S. Pat. No. 4,932,390 issued to Ceravolo wherein there is disclosed is a food support grid that is adjustable both vertically and rotatively so as to provide for the food to be position at a certain location above the heat source.

Yet another example of a device which does not drastically disrupt the cooking temperature when inspecting the cooked food is seen in U.S. Pat. No. 4,840,118 issued to Rinehart. In this patent there is disclosed a grill having a grate or tray which is sidably mounted on tracks. This grate or tray is pulled horizontally outwardly from the interior of the housing for rendering an inspection of food in a smoke-free environment.

To address the concerns of flames that can develop as drops of fat fall into the heating chamber of a grill, in U.S. Pat. No. 4,628,896 issued to Baynes discloses a barbecue grill featuring a moveable grid. This grid can be shifted horizontally to move the meat away from the heating chamber, and once the flames subside can be replace thereon at the desired position.

Accordingly, it is seen that there exist a numerous styles of grills, each address a specialized concern or problem generally associated with grilling. What is not disclosed is a grill that includes a means of adjusting, either by increasing and/or decreasing the particular cooking surface. In addition, the prior is silent to a means of adjusting the height of the actual grill for consequently providing a grill that can easily be transportable as well as convenient to the user. As can be seen, what is needed is a grill apparatus that will successfully and efficiently accommodate any amount of food without adversely affecting the time, space, energy and fuel used with the cooking particular of the particular amount of food.

As will be seen, the present invention achieves its intended purposes, objectives and advantages by accomplishing the needs as identified above, through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention is a unique multifunctional portable barbecue grill that is designed and configured to expand in order to increase the total size the cooking surface of the particular grill. In addition, for convenience and added comfort, the mainframe of the grill can be altered in sized to provide for a comfortable height for the cook as well as provide for an easy means for storage and transportability.

In order to provide for such a configuration, the present invention comprises a support frame that maintains housing. The support frame and housing each include an inner member and an outer member. The inner member being slideably mounted within the outer member. As such, the outer member of the support frame includes a horizontal support arm and a pair of vertical legs attached to a side thereof. The outer support arm includes an opening, which forms a sleeve for receiving and maintaining a support arm of the inner frame. A second pair of vertical legs is attached to the opposite side of the inner frame. In use the inner arm will slide into the sleeve of the outer arm and the legs of the inner and outer supports will maintain the grill body of the present invention. For ease of adjustment and for ease in transportability, each leg can include lockable wheels.

The inner member of the housing is attached to the inner arm. Thus, as the arm is slid outward, the inner member of the housing will inherently slide outward. The inner member and outer member of the housing each include a lower section and an upper section. The lower section maintains the heating element, such as lava rocks for gas grills or coals for charcoal grills. The lower section of the inner member includes an access means for allowing access to the interior for permitting maintenance to occur as necessary. Hindgedly secured to lower section is the upper section. This upper section acts as the lid and as such each includes a handle for lifting the lid and apertures for ventilation. A thermostat or the like can also be located on each lid for displaying the temperature within the housing. A shelf or the like can be exteriorly attached to the housing of the inner frame member, outer frame member or a combination thereof.

To enable the slideable connection of the housing, the inner member is substantially the same shaped, but smaller in size to allow for inner member to slide freely into the outer member. A locking device can be attached to provide for the inner member to be in a locked and secured position once the desired length is met.

Removably secured the lower section of the inner and outer housings is a grate. The outer grate member includes a plurality of parallel disposed hollow sleeves. Slideably located within each sleeve is a rod. As the inner frame is pulled outward, the housing is inherently adjusted horizontally, causing the rods to be removed from the hollow sleeves. Once at the desired located, the housing and/or frame are locked into position, and the sleeves and rods form the cooking surface. Thus providing for the sleeves and rods to form the grate.

For enhancing the present invention, the legs on the inner and outer frame member can be adapted to be adjustable vertically. To provide for such an adjustment, conventional adjusting means can be utilized. Thereby, providing a grill that can be used by any individual, regardless of size and height, as well as provide for a grill that can easily be transported and stored.

Accordingly, it is the object of the present invention to provide a multifunctional portable barbecue grill that includes expandable capabilities so as to provide for a grill apparatus that will overcome the deficiencies, shortcomings, and drawbacks of the prior art and methods thereof.

Accordingly, it is the object of the present invention is to provide a novel and unique multifunctional portable barbecue grill which is adapted to easily and efficiently adjusted in length so as to innately increase the cooking surface of the portable grill.

Another object of the present invention is to provide a multifunctional portable barbecue grill apparatus that is easy to operate, successful in grilling regardless of its size and one that will safely allow for alternating size differences.

Yet another object of the present invention is to provide a multifunctional portable barbecue grill apparatus that is lightweight, adjustable in height, and one that is completely portable.

A final object of the present invention, to be specifically enumerated herein, is to provide a portable expansion barbecue grill in accordance with the preceding objects and which will conform to conventional forms of manufacture, be of simple construction and easy to use so as to provide a device that would be economically feasible, long lasting and relatively trouble free in operation.

Although there have been other barbecue grills, none of these inventions utilize a means of extending the cooking area of the grill as disclosed with the present invention. In addition the present invention will prove to be sufficiently compact, low cost, and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWING

Similar reference numerals refer to similar parts throughout the several views of the drawings.

DESCRIPTION OF THE PREFERRED EMBODIMENT

Figure 1:
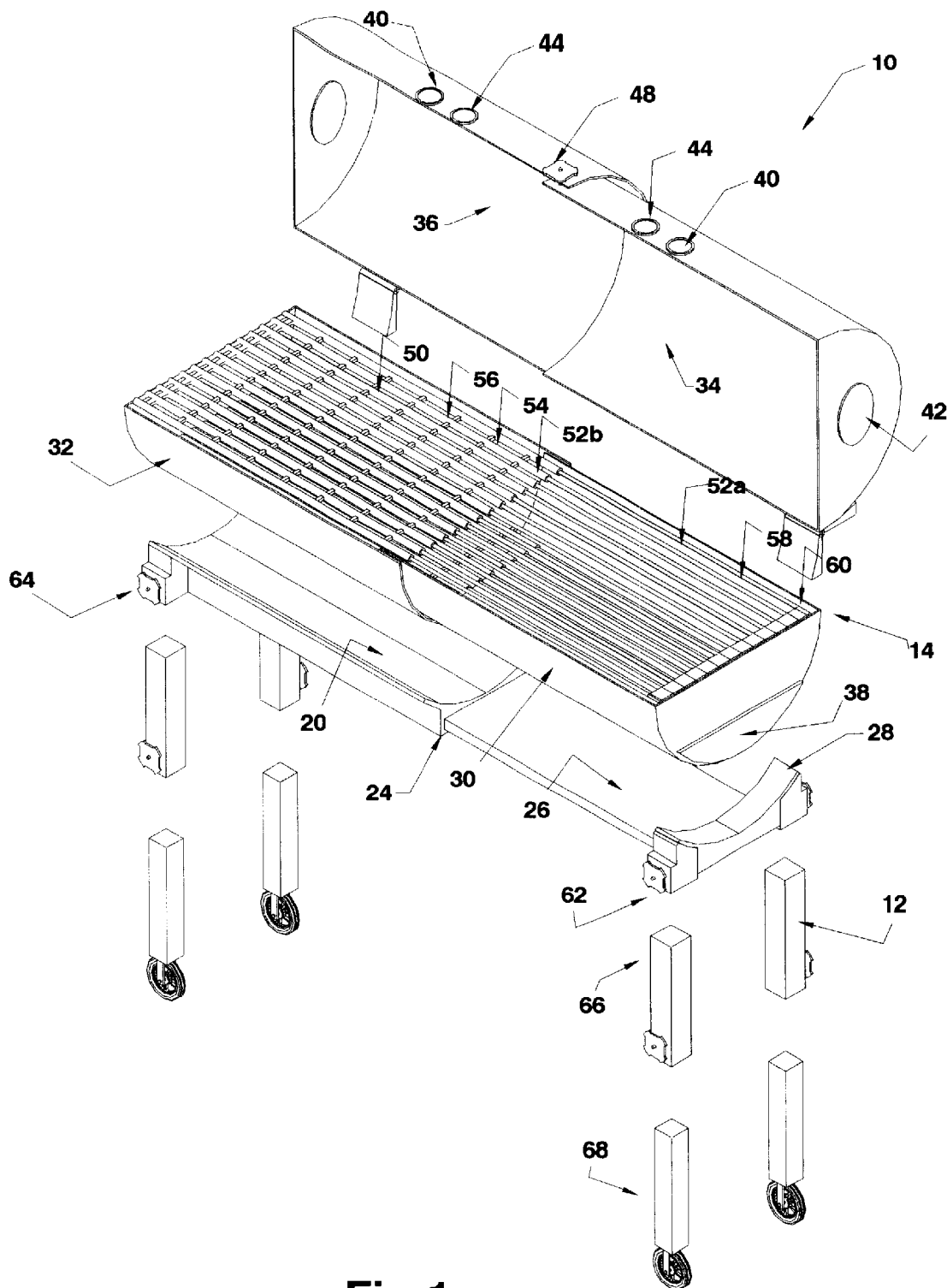
FIG. 1 is an exploded perspective view of the multifunctional portable barbecue grill apparatus of the present invention, in an expanded position.
Figure 2:
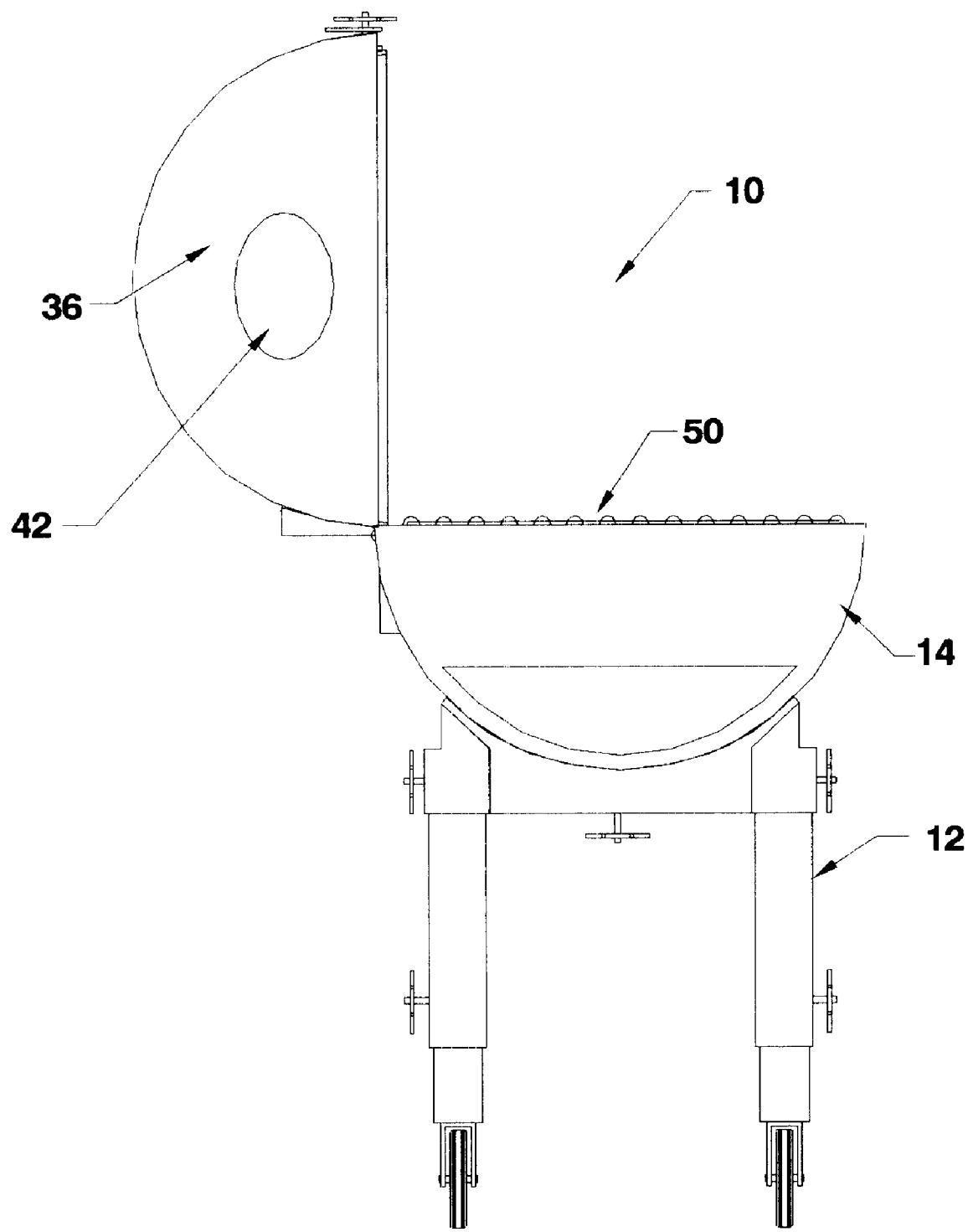
FIG. 2 is a side view of the multifunctional portable barbecue grill apparatus of the present invention.
Figure 3:
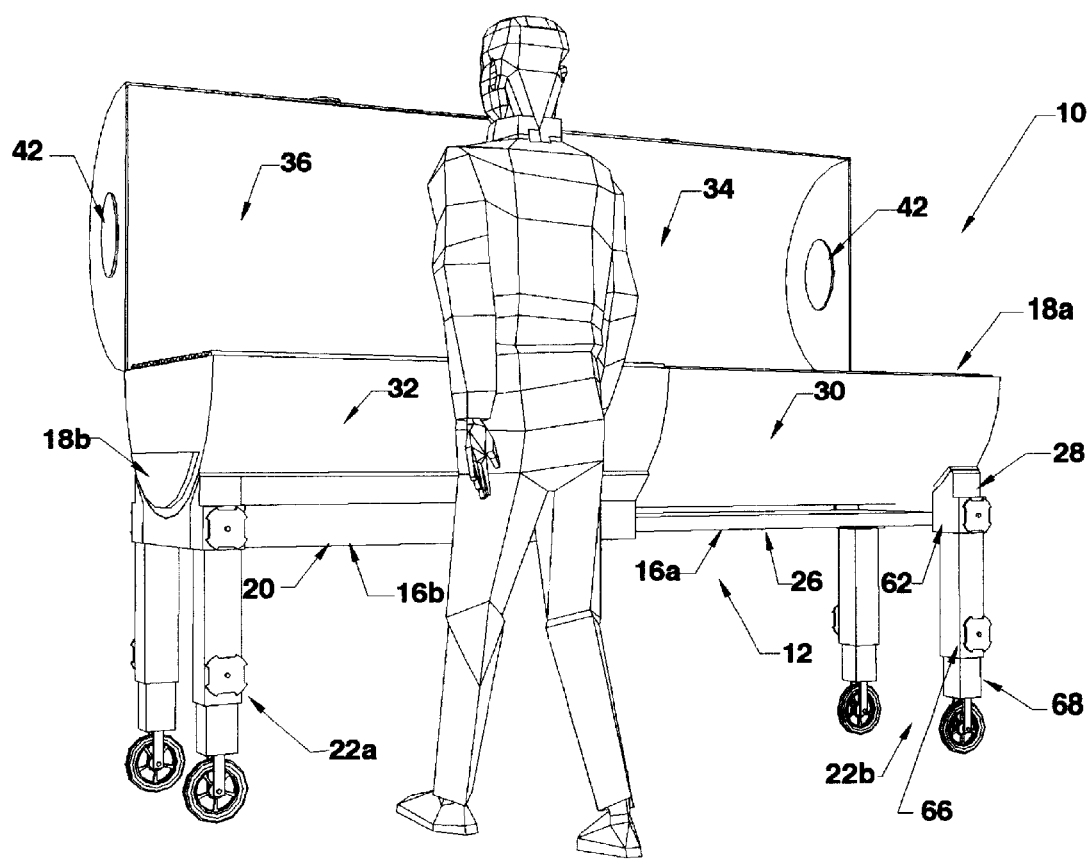
FIG. 3 is a perspective front view of the multifunctional portable barbecue grill apparatus of the present invention in an extended position.
Figure 4:
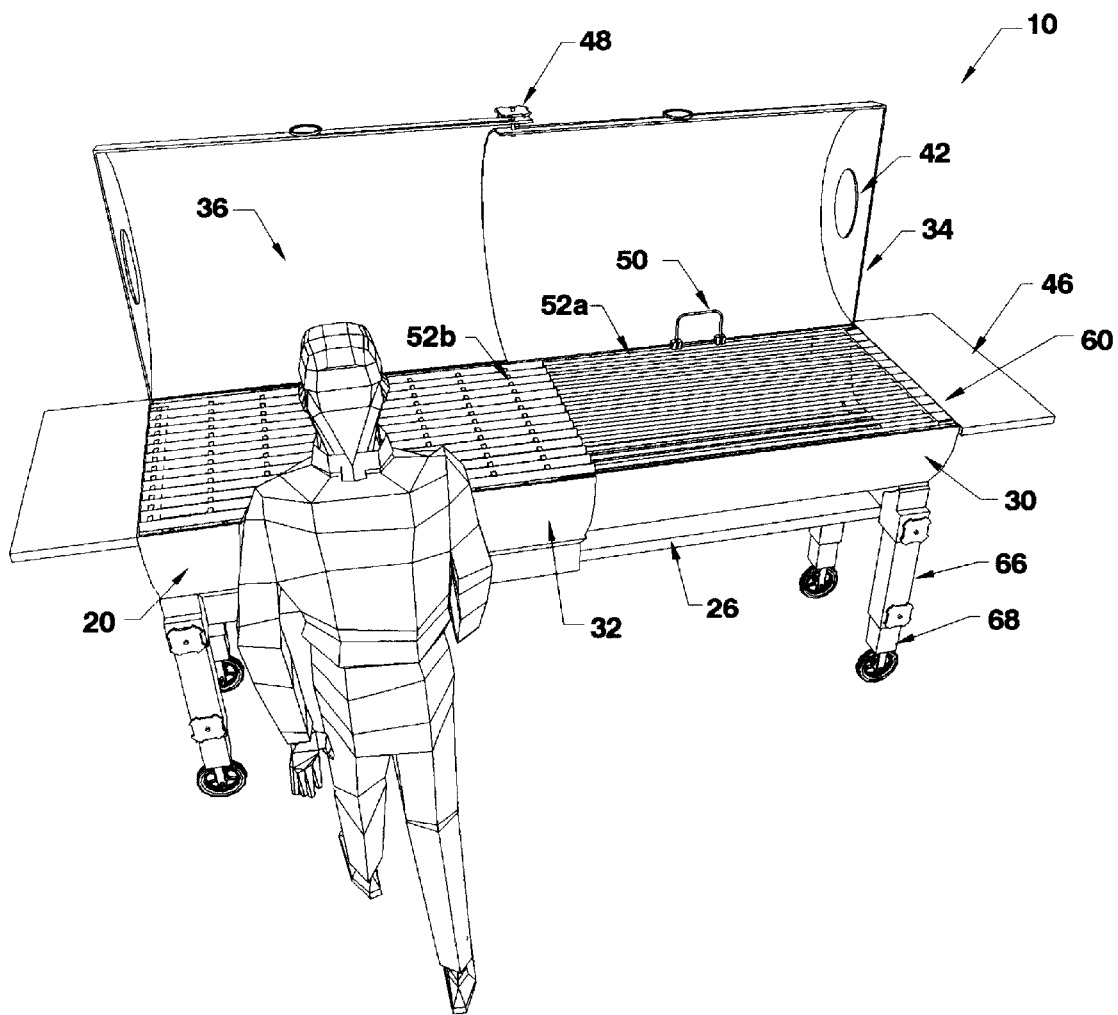
FIG. 4 is a top perspective view of the multifunctional portable barbecue grill apparatus of the present invention in an extended position.

With reference to the drawings, in particular to FIGS. 1–4 thereof, the present invention, denoted by reference number 10, known as a portable expandable barbecue grill will be described. As seen in the figures, the present invention is a grill apparatus 10 designed and configured to adjust in length so as to provide for an increase or decrease in cooking surface. In addition, the present invention can be altered in height so as to accommodate any size person, or alternatively, to provide for a device that can easily be towed via vehicle or stored at any location.

To provide for such a configuration, the present invention comprises a present invention comprises a support frame 12 that maintains a housing 14. The support frame and housing each include an inner member 16a, 18a, respectively, and an outer member 16b, 18b respectively. The inner member 16a of the frame being slideably mounted within the outer member 16b of the frame. The inner member of the housing 18a being slideably mounted within the outer member of the housing 18b.

As such, the outer member 16b of the support frame 12 includes a horizontal support arm 20. This support arm 20 includes an outer end and an inner end. Secured to the outer ends is a pair of vertical legs 22a. Slideably mounted to the inner end of the support arm 20 is the inner frame member 16a. To receive the inner frame member 16a, the support arm 20 includes a groove 24 that forms a sleeve. The outer support arm 20 includes an opening, which forms a sleeve for receiving and maintaining a support arm of the inner frame. This outer support arm 20 is secured exteriorly to the outer housing 18b.

An inner support arm 26 includes an outer end and an inner end. The inner end is received within the groove 24 and as such provides for the inner support arm 26 to be slideably mounted within the groove 24. Located at the outer end of the inner support arm 26 is an attaching member 28. This member receives the outer end of the inner housing 18a so as to provide for the outer end of the inner housing to be secured to the inner support arm 26 via the attaching member 28. Also secured to this attaching member 28 is a second set of vertical legs 22b. Though not illustrated, a handle can be attached to this attaching member for enabling the user to grab the handle and pull or push the inner support arm 26 out or in the groove of the outer support arm 20. Accordingly, as the user pulls out the attaching member, the inner support bar slides out of the groove. Since the attaching member is attached to the inner housing, the inner housing is inherently slid out or m as well. Thus rendering an extended or non-extended grill.

A locking device, as illustrated but not labeled, can be located on the frame. This locking device is conventional and will ensure that the inner frame member will be secured to the outer frame member when in a desired position.

As seen in the various drawings, FIGS. 1–4, the inner member 18a and outer member 18b of the housing 14 each include a lower section 30 and 32, respectively and an upper section 34 and 36, respectively. The lower section 30 and 32 maintains the heating element, such as lava rocks for gas grills or coals for charcoal grills. The lower section will be designed so as to accommodate the preferred heating system. The lower section 30 of the inner member 18a, and/or the lower section 32 of the outer member 18b include an access means 38 for allowing access to the interior for permitting maintenance to occur as necessary. Hindgedly secured to lower section 30 and 32 is the upper section 34 and 36. This upper section 34 and 36 act as the lid and as such each includes a handle 40 for lifting the lid and apertures 42 for ventilation. This aperture can include a pivotally or hingedly located cover for enabling the user to decide the need and the amount for ventilation. It is noted that the handle located on the inner housing is sized such that the housing can slid freely within the outer housing and be non-obtrusive. A thermostat 44 or the like can also be located on each lid for displaying the temperature within the housing. A shelf 46 or the like can be exteriorly attached to the housing 14 of the inner housing, outer housing or a combination thereof.

To enable the slideable connection of the housing 14, the inner member 18a is substantially the same shape, but smaller in size to allow for inner member 18a to slide freely into the outer member 18b. A locking device 48 can be attached to provide for the inner member to be in a locked and secured position once the desired length is met. This locking member 48 can be any conventional locking device. This locking device can be located on the lid, on any surface of the housing or a combination thereof This will provide for a locking device that can be located at any location that will enable adequate locking capabilities.

Removably secured the lower section 30 and 32, respectively, of the inner and outer housings 18a and 18b, respectively is a grate 50. The grate comprises an inner grate member 52a and an outer grate member 52b, wherein the inner grate is slideably secured to the outer grate member. As seen in the drawings the outer grate 52b is secured to the lower section of the outer housing via conventional means such as by hooks, groove or the like. This grate 52b includes a plurality of parallel disposed hollow sleeves 54. Perpendicular crossbars 56 can be secured to the hollow sleeves for additional support.

Slideably located within each sleeve 54 is a rod 58. Each rod includes an inner end and an outer end. The inner is received within the sleeve. The outer end is secured to a perpendicularly disposed cross bar 60. This cross bar 60 is removably secured to the inner housing via conventional means, such as by hooks or the like. Optionally, the front most and back most rod can be secured to the side of the housing. This will ensure the securement of the grate.

Accordingly, as the inner frame is pulled outward, the housing is inherently adjusted horizontally, causing the rods to be removed from the hollow sleeves. Once at the desired length is located, the housing and/or frame are locked into position, and the sleeves and rods form the cooking surface. Thus providing for the sleeves and rods to form the grate. A handle can be secured to the inner and outer portions of the grate. This handle is illustrated but not labeled. As seen in the drawings, the handle is secured to the outer grate and is slideable mounted to the inner grate. To provide for a slideably connection, conventional means is utilized. In this embodiment, as shown, the handle on the inner grate includes an aperture. This aperture receives a rod of the inner grate. The rod slides within this aperture and thus enables the handle to accommodate any length grate. Two handles can be located thereon to provide for a handle to be located near the front of the grill and a second handle to be located in the rear of the grill. This arrangement will ensure adequate removal of the grate.

For enhancing the present invention, the legs can include lockable wheels, illustrated, but not labeled. The wheels can be enlarged to provide for the grilled to be transported across a variety of terrain, easily and effortlessly. In addition the legs can be adjusted and/or removably from the support bars. This provides for a grill that can be utilized by any cook, regardless of their size or stored for easy transportation.

The legs can be adjusted via any conventional means, but preferably, and as illustrated, the legs can be adjusted via the system as shown in the figures. As seen, the support 20 and attaching member 28 include a receiving member 62 for each leg. The receiving member will lock the upper end of the leg via the use of a butter fly nut 64. The upper portion of each leg 66 is secured to the receiving member 62. This upper portion 66 is designed and configured to slideably receive the lower portion of the leg 68. In order to achieve the desired height, the lower portion of the leg 68 is slid within the upper portion 66. Once the desired height is achieved, the lower portion is locked into place via a butterfly pin or the like, as shown.

While the invention has been particularly shown and described with reference to an embodiment thereof, it will be understood by those skilled in the art that various changes in form and detail may be made without departing from the spirit and scope of the invention.

I claim:

1. A portable expandable barbecue grill comprising:
   a frame member having an inner portion slideably located within an outer portion;
   a housing secured to said frame having an inner portion slideably located within an outer portion;
   a grate secured interiorly to said housing and said grate having an inner portion slideably located within an outer portion, and
   said inner portion of said frame member is adapted to slide inward or outward for decreasing or increasing the size of said frame, proving said housing to decrease or increase in size and providing said grate to increase or decrease in size for increasing or decreasing a cooking surface of said portable expandable barbecue grill.

2. A portable expandable barbecue grill as in claim 1 wherein said inner portion of said frame member includes a first set of a plurality of vertical legs and said outer portion of said frame includes a second set of a plurality of vertical legs.

3. A portable expandable barbecue grill as in claim 2 wherein said first set of legs and said second set of legs include wheels for providing said grill to be transportable.

4. A portable expandable barbecue grill as in claim 3 wherein said first set of legs and said second set of legs are adjustable in height via an adjusting element.

5. A portable expandable barbecue grill as in claim 1 wherein said grate of said inner portion and said grill of said outer portion is removable from said housing.

6. A portable expandable barbecue grill as in claim 1 wherein at least one shelf is attached exterior to said housing.

7. A portable expandable barbecue grill as in claim 1 wherein a vent is located in said inner portion of said housing and said outer portion of said housing.

8. A portion expandable barbecue grill as in claim 1 wherein a thermostat is located on said housing for determining interior temperature of said housing.

9. A portable expandable barbecue grill as in claim 1 wherein at least one locking device is located on said housing for locking said inner portion of said housing and said outer portion of said housing in a desired length.

10. A portable expandable barbecue grill as in claim 1 wherein at least one locking device is located on said frame member for locking said inner portion of said frame member and said outer portion of said frame member in a desired length.

* * * * *